G. H. SPAULDING.
HARVESTER.
No. 183,822.  Patented Oct. 31, 1876.
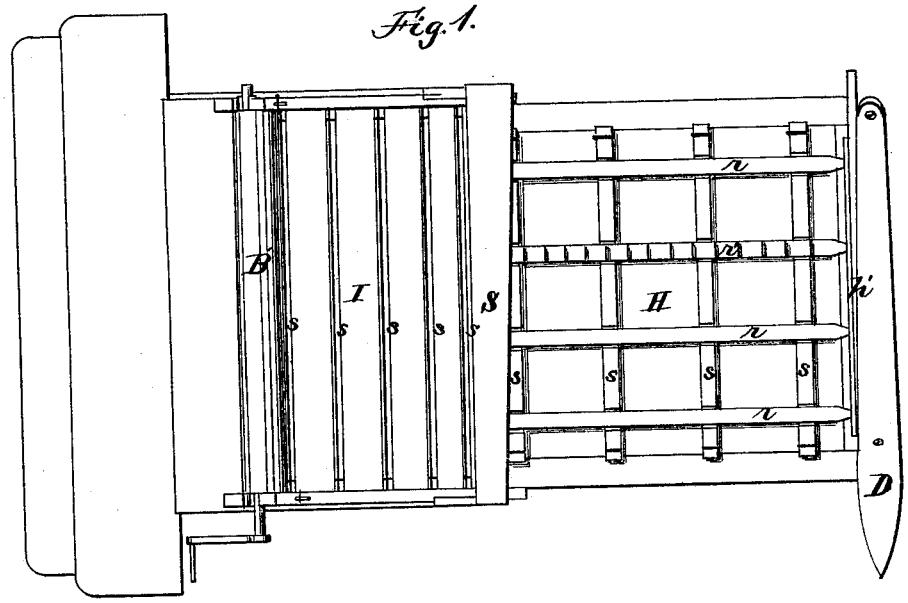
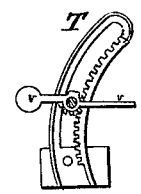
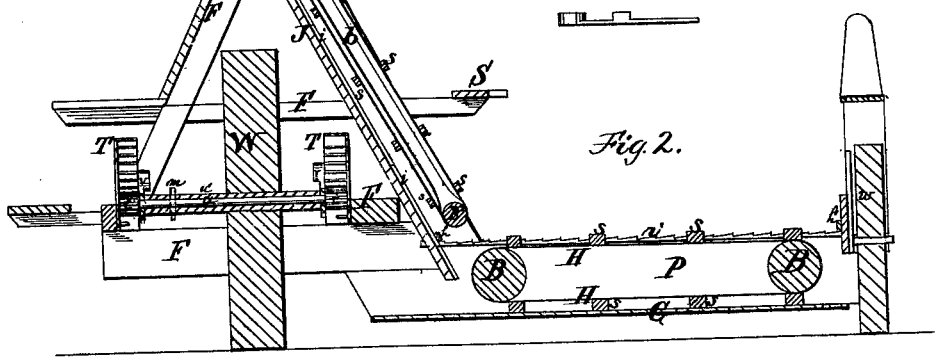
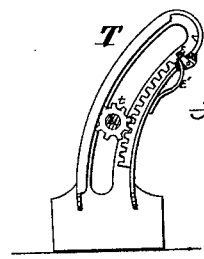
WITNESSES
INVENTOR
George H. Spaulding
By Hill & Ellsworth
His ATTORNEYS.

UNITED STATES PATENT OFFICE.

GEORGE H. SPAULDING, OF ROCKFORD, ILLINOIS, ASSIGNOR OF ONE-HALF HIS RIGHT TO WM. A. KNOWLTON, OF SAME PLACE.

IMPROVEMENT IN HARVESTERS.

Specification forming part of Letters Patent No. 183,822, dated October 31, 1876; application filed September 22, 1876.

*To all whom it may concern:*

Be it known that I, GEORGE H. SPAULDING, of Rockford, in the county of Winnebago and State of Illinois, have invented certain new and useful Improvements in Harvesting-Machines; and I do hereby declare the following to be a full, clear, and exact description of the same, reference being had to the accompanying drawings, forming part of this specification, in which—

Figure 1 is a top-plan view; Fig. 2, a longitudinal vertical section; and Figs. 3 and 4 are detail views of the curved rack and pinion.

Similar letters of reference in the accompanying drawings denote the same parts.

This invention pertains to that class of self-raking harvesters in which one or more endless aprons are employed to deliver the cut grain to an elevated receptacle for binding.

The first feature of my invention relates particularly to the grain conveying and elevating apparatus; and consists in certain improvements in the construction thereof, for the purpose of increasing the efficiency and uniformity of its operation. The second feature of my invention relates to a recently-invented device for raising and lowering the frame of the harvester upon the axle of the driving and supporting wheel; and consists in an improved means by which the power of the team can be applied to that purpose, instead of depending upon hand-power.

In the drawings, P indicates the platform; F F F, parts of the frame; W, the driving and supporting wheel; $w$, the outer wheel; D, the divider; H, the horizontal endless apron, which receives the cut grain, and conveys it to the elevator, and I the inclined endless elevating-apron, which receives the cut grain from the apron H and conveys it to the receptacle where it is bound, or from which it is taken to be bound.

In my improved conveying and elevating apparatus I arrange a horizontal table or board, G, beneath the apron H, and an inclined board, J, behind the apron I, as shown in the drawings. The apron H is supported upon two rolls, B B, driven by any suitable power, while the apron I is supported upon, and driven by, the upper roll $B^1$, and is kept at a suitable tension by a lower roll, $B^2$, mounted in side bars $b\ b$, hung upon the journals or shafts of the upper rolls. The aprons are each provided with slats $s$, for the purpose of taking a better hold of the grain. The slats of the horizontal apron, however, are notched, to accommodate a series of bars, $r\ r$, upon which the cut grain is supported while it is moved along by the operation of the notched slats, the upper faces of which extend slightly above the surface of the bars. As the butts of the stalks are liable to move more slowly than the heads, one of the bars $r'$ is notched or serrated, as shown in Figs. 1, 2, so as to catch slightly in the heads of the grain, and retard their movement, thus causing the stalks to be presented evenly to the elevating-apron. The bars $r\ r'$ are interchangeable, so that the notched or roughened one, $r'$, can be adjusted toward or from the sickle-bar, according to the length of the stalks in which the machine is operating. The incline J is provided with a series of bars, $i\ i$, upon which the grain is slidden upward by the action of the slats $s$ of the elevating-apron. A wooden or metallic cleat, $h$, the outer surface of which may be concave, if preferred, is fastened over the proximate ends of the bars $r\ r'\ i\ i$, in order to cover them smoothly, prevent the grain from catching, and present it properly to the action of the elevating-apron. The outer ends of the bars $r\ r'$ are held down by a cleat, $h'$, secured by screws, so that it can be readily removed, when necessary, to change the position of the bars, or to adjust or repair the apron.

It will be observed that the lower end of the apron I swings freely upon the shaft $B^1$, as upon a pivot, and rests against the inclined bars $i\ i$. It is thus at liberty to adjust itself to the grain that is fed to it by the horizontal apron, and its weight, resting partly upon the grain, enables it to hold the latter securely, and thereby materially assists in the certainty and efficiency of its operation. A stop bar or board, S, prevents it from being swung out too far; and may also be employed, if desired, as a foot-board, upon which the binder or other attendant may step or stand, when necessary, for any purpose whatever.

In my improved device for raising and lowering the frame, T T indicate the curved rack-segments; t t, the pinions on the ends of the shaft of the wheel W, adapted to work in said rack-segments; u, the central rod or bar of said wheel-shaft, to which the pinions are fixed; u', the outer sleeve of the shaft, to which the wheel W is attached, said sleeve rotating freely on the central rod u, and v v the weighted pawl-levers, which engage with the racks or with suitable ratchets, to hold the frame securely in position when once properly adjusted. As heretofore constructed, it was necessary, by the aid of a lever or other similar means, to raise the frame by hand-power whenever it became desirable to readjust its height on the supporting-axle—a mode of operation which occasions no little inconvenience and labor. For this awkward and inconvenient mode of operation, I have, by the employment of an exceedingly simple and inexpensive device, enabled the power of the team to be employed for the purpose of raising and lowering the frame whenever necessary. Such device consists merely of a removable pin, m, passing through the sleeve u' and central rod u, in a suitable hole bored for the purpose, as represented in Fig. 2, and, when in use, locking said sleeve and rod firmly together, so that they cannot rotate independently of each other. I have selected the pin as the most simple mode of locking the parts together, although, of course, any kind of clutch or lock that will accomplish the result, will answer my purpose. When thus locked together the pinions t t will, of course, run up or down in the segments, and adjust the frame at any height desired by turning the shaft u u' or the wheel W, and this may be readily and easily accomplished by simply starting up or backing the team. When the frame is raised or lowered to the desired height, the pin is removed and fastened to some convenient part of the machine, and the wheel runs independently of the pinions again, as before.

To prevent the pinions from running up too far and breaking the machinery by suddenly striking against the upper end of the slat, or of the arched plate T, the upper tooth e of the rack may be pivoted and held in place by a spring, e', which will yield when the pinion takes hold of the tooth, and thus prevent the pinion from rising against the top of the arched plate T. When this tooth yields it moves down to and rests upon the next tooth below, and its upper side is beveled off, so that, when resting on the lower tooth, it forms an incline over which the teeth of the pinion slide freely.

Having described my invention, I claim as new—

1. In a harvester, the combination of the smooth bars r r, with the roughened bar r', and the slats or projections s of an endless apron, substantially as and for the purposes described.

2. The wheel W, shafts u u', pin m, racks T T, pinions t t, and lever-pawls v v, combined substantially as and for the purposes set forth.

3. In a machine for harvesting grain, the pivoted spring-tooth e, combined with the curved rack T, and the traveling pinion t, substantially as and for the purposes set forth.

GEO. H. SPAULDING.

Witnesses:
JOHN M. WALDRON,
JAMES FERGUSON.